(12) United States Patent
Flores Perez et al.

(10) Patent No.: US 11,840,614 B2
(45) Date of Patent: Dec. 12, 2023

(54) METHODS OF MANUFACTURING HIGH TEMPERATURE CONFORMABLE POLYMERIC SCREENS

(71) Applicants: Juan Carlos Flores Perez, The Woodlands, TX (US); Rostyslav Dolog, Houston, TX (US)

(72) Inventors: Juan Carlos Flores Perez, The Woodlands, TX (US); Rostyslav Dolog, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 252 days.

(21) Appl. No.: 17/529,611

(22) Filed: Nov. 18, 2021

(65) Prior Publication Data
US 2023/0151173 A1    May 18, 2023

(51) Int. Cl.
*E21B 43/08*  (2006.01)
*E21B 43/10*  (2006.01)
(Continued)

(52) U.S. Cl.
CPC .......... *C08J 9/103* (2013.01); *B29C 44/1252* (2013.01); *B29C 44/188* (2013.01); *B29C 44/50* (2013.01); *C08J 9/08* (2013.01); *E21B 43/082* (2013.01); *E21B 43/108* (2013.01); *B29K 2705/00* (2013.01); *B29K 2995/0059* (2013.01); *B29L 2031/14* (2013.01); *C08J 2201/03* (2013.01); *C08J 2203/02* (2013.01); *C08J 2203/04* (2013.01); *C08J 2203/22* (2013.01); *C08J 2369/00* (2013.01); *E21B 2200/08* (2020.05)

(58) Field of Classification Search
CPC ........ C08J 9/103; B29C 44/188; B29C 44/50; E21B 43/082; E21B 43/108
See application file for complete search history.

(56) References Cited

U.S. PATENT DOCUMENTS 8,528,633 B2    9/2013  Agrawal et al.
9,101,978 B2    8/2015  Xu et al.
(Continued)

FOREIGN PATENT DOCUMENTS

WO    WO2013/189767    * 12/2013    ............... B32B 1/08

OTHER PUBLICATIONS

Amcor Inc, "Resam PPS™ is a complete raw material system from Amcor that produces light weight, rigid plastic foam to replace wood and other heavy structural products", 4 pages, 2019.
(Continued)

*Primary Examiner* — Cathleen R Hutchins
(74) *Attorney, Agent, or Firm* — CANTOR COLBURN LLP (57) ABSTRACT

A method of manufacturing a fluid control device includes extruding a polymer melt into a chamber defined by an outer surface of a support structure and a disintegrable metallic tubular member disposed at the support structure, the polymer melt comprising a high heat polymer and a foaming agent, the high heat polymer having a heat deflection temperature of about 100° C. to about 300° C. measured at 1.82 MPa in accordance with ASTM D648-18; sealing the chamber; and foaming the high heat polymer to produce a porous filtration medium in a compacted shape.

17 Claims, 5 Drawing Sheets

(51) Int. Cl.
*C08J 9/10* (2006.01)
*B29C 44/18* (2006.01)
*B29C 44/50* (2006.01)
*C08J 9/08* (2006.01)
*B29C 44/12* (2006.01)
*B29L 31/14* (2006.01)
*B29K 705/00* (2006.01)

(56) References Cited

U.S. PATENT DOCUMENTS

| | | |
|---|---|---|
| 10,016,810 B2 | 7/2018 | Salinas et al. |
| 10,221,637 B2 | 3/2019 | Xu et al. |
| 2012/0067587 A1* | 3/2012 | Agrawal .................... C08J 9/36 |
| | | 166/309 |
| 2013/0292117 A1* | 11/2013 | Robisson .............. E21B 43/103 |
| | | 166/227 |

OTHER PUBLICATIONS

Eagle Performance Plastics, "Polyphenylene Sulfide (PPS)", retrieved from www.eagleperformance.com, 2 pages.
Solvay, "Solvay's Udel® PSU Foam Is New Eco-Friendly Material Option for Wire and Cable Applications: Udel® P-1703 NT is First PSU Foam for Wire and Cable", Press release, 2 pages, Apr. 7, 2014.
Solvay, "Radel® R-1050 PPSU Foam: Formable Foam for Insulative and Structural Applications", Technical Bulletin, D Mar. 2012, R Jul. 2013, Version 2.0, 3 pages.
Tendeka: "Filtrex—The One Trip Remedial Sand Control System: Compressible Open Cell Matrix Polymer regains sand control intergrity", 2020, 2 pages.

* cited by examiner

METHODS OF MANUFACTURING HIGH TEMPERATURE CONFORMABLE POLYMERIC SCREENS

BACKGROUND

Various tools are utilized in subterranean operations, such as hydrocarbon exploration, drilling and completion operations, to increase or maximize production efficiency. Sand control devices such as sand screens are utilized to control the ingress of particulate contaminants into production fluid and to aid in stabilizing production formations. Examples of sand control devices include screen assemblies having conformable sleeves or components that are expanded downhole. In some cases, high temperature conditions experienced downhole can affect the performance of such sand control devices. Accordingly, there is a need for flow control devices having high temperature conformable screens and methods of manufacturing such flow control devices.

SUMMARY

A method of manufacturing a fluid control device includes extruding a polymer melt into a chamber defined by an outer surface of a support structure and a disintegrable metallic tubular member disposed at the support structure, the polymer melt comprising a high heat polymer and a foaming agent, the high heat polymer having a heat deflection temperature of about 100° C. to about 300° C. measured at 1.82 MPa in accordance with ASTM D648-18; sealing the chamber; and foaming the high heat polymer to produce a porous filtration medium in a compacted shape.

A method of manufacturing a fluid control device includes extruding a foam into a chamber defined by an outer surface of a support structure and a disintegrable metallic tubular member disposed at the support structure, the foam comprising a high heat polymer having a heat deflection temperature of about 100° C. to about 300° C. measured at 1.82 MPa determined according to ASTM D648.

A fluid control method includes manufacturing a fluid control device according to a method as described herein above; deploying the fluid control device in a borehole; removing the disintegrable metallic tubular member to cause the porous filtration medium to expand, and conform to a surface of the borehole; and flowing a fluid through the porous filtration medium.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Methods of manufacturing flow control devices, and methods for filtering fluid (e.g., filtering sand and other undesirable material from fluid in a downhole environment) are described herein.

Figure 1A:
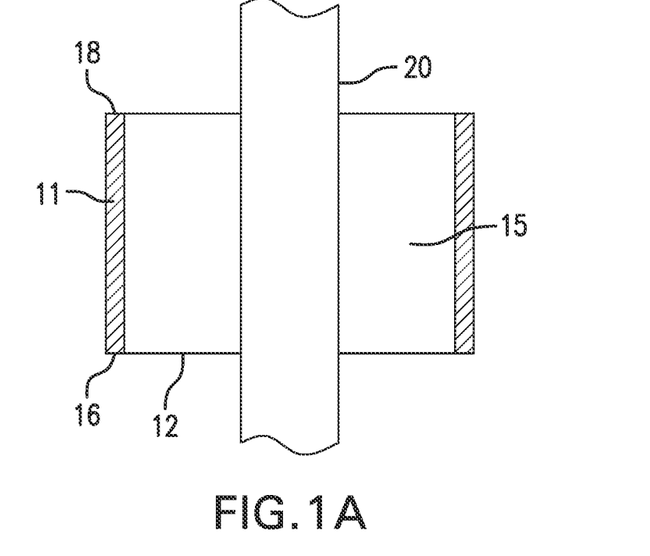
FIG. 1A and FIG. 1B illustrate a flow control device including a support structure bearing a tubular member having a tubular body and a seal element positioned on an end of the tubular body, where the tubular body, the seal element and an outer surface of the support structure form a chamber.
Figure 1B:
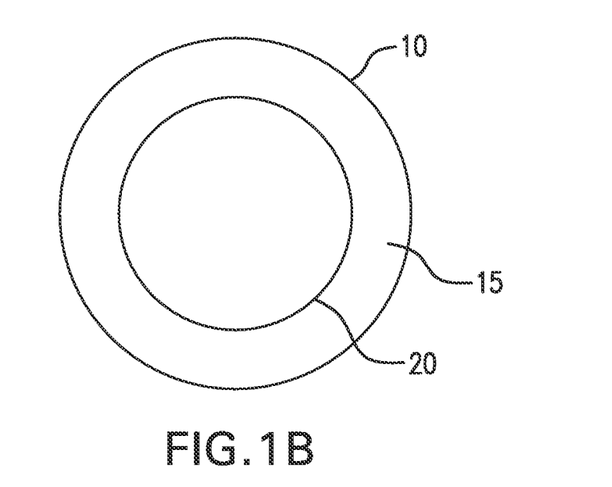

Referring to FIG. 1A and FIG. 1B, to manufacture a fluid control device, a disintegrable metallic tubular member 10 is disposed at a support structure 20. The support structure 20 can be a tubular support structure such as a perforated base pipe. The disintegrable metallic tubular member 10 has a tubular body 11 with a first end 16 and an opposite second end 18, and a seal element 12 positioned onto the tubular body 11 at the first end 16 of the tubular body. The tubular body 11, the seal element 12 and an outer surface 21 of the support structure form a chamber 15.

The tubular body has a corrosion rate of about 0.1 to about 450 mg/cm$^2$/hour, specifically about 1 to about 450 mg/cm$^2$/hour determined in aqueous 3 wt. % KCl solution at 200° F. (93° C.).

The tubular body can comprise a metallic matrix material of one or more of Zn, Mg, Al, or Mn, or an alloy thereof. The tubular body can further comprise a disintegrating agent including one or more of Ni, W, Mo, Cu, Fe, Cr, or Co, or an alloy thereof in the metallic matrix. The amount of the metallic matrix material is about 50 wt % to about 99.9 wt %, specifically about 70 wt % to about 99.9 wt %, more specifically about 85 wt % to about 99.9 wt % based on the sum of the weight of the metallic matrix material and the disintegrating agent. The amount of the disintegrating agent is about 0.1 wt % to about 50 wt %, about 0.1 wt % to about 15 wt %, or about 0.1 wt % to about 15 wt %, each based on the sum of the weight of the metallic matrix material and the disintegrating agent.

Optionally, the tubular body further comprises additional materials such as carbides, nitrides, oxides, precipitates, dispersoids, glasses, carbons, or the like in order to control the mechanical strength and density of the tubular body.

Methods of making the degradable substrate have been described, for example, in U.S. Pat. Nos. 8,528,633, 9,101,978, 10,221,637, and 10,016,810.

The tubular body can have a wall thickness of about 1/32 inch to 1 inch, about 1/32 inch to 1/2 inch, about 1/16 inch to about 1 inch, or about 1/16 to about 1/2 inch.

Figure 2A:
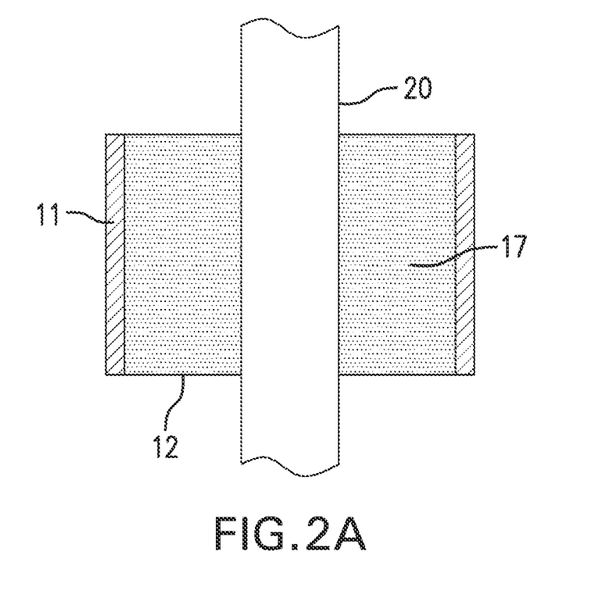
FIG. 2A and FIG. 2B illustrate the flow control device of FIG. 1A and FIG. 1B where a polymer melt is disposed in the chamber.
Figure 2B:
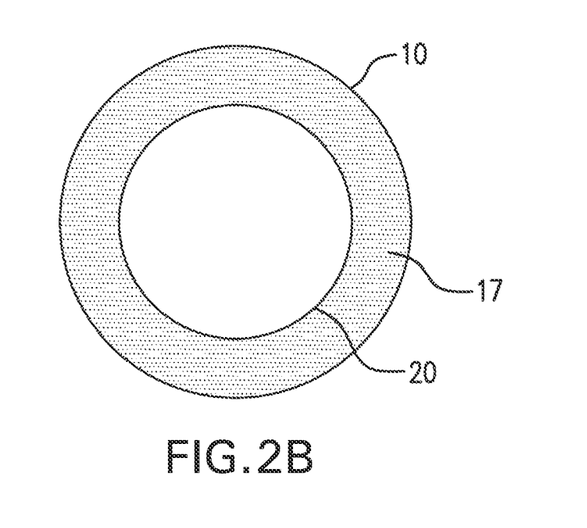

Next, a polymer melt 17 is extruded into the chamber 15 as shown in FIG. 2A and FIG. 2B. The polymer melt comprises a high heat polymer and a foaming agent. A heat deflection temperature is a measure of polymer's resistance to distortion under a given load at elevated temperatures. The high heat polymer as disclosed herein can have a heat deflection temperature of about 100° C. to about 300° C. or about 150° C. to about 280° C. measured at 1.82 MPa in accordance with ASTM D648-18.

The high heat polymer can be a thermoset polymer, a high temperature thermoplastic elastomer, or a thermoplastic polymer. Preferably the thermoplastic polymer is cross-linked. Examples of the high heat polymer includes polysulfone (PSU), polyphenylsulfone (PPSU), polyether ether ketone (PEEK), polyphenylene sulfide (PPS), polyetherimide (PEI), polyamide-imide (PAI), polyimide (PI), polybenzimidazole (PBI), polytetrafluoroethylene (PTFE), polyethylene terephthalate (PET), polycarbonate (PC), polyether sulfone (PES), or polyether ketone (PEK). The polymer melt can contain two or more high heat polymers.

The foaming agent can comprise one or more of a gas-producing chemical or a polymeric microsphere. Examples of the gas-producing chemical include azodicarbonamide, sodium bicarbonate, a combination of sodium carbonate and citric acid, sodium polyacrylate, polypropylene carbonate, isocyanate, and polysiloxane. The gas-producing chemical foaming agent can produce a gas that create pores in response to heat or other activation mechanism.

The polymeric microsphere is preferably an expandable polymeric microsphere. The expandable microsphere can comprise a polymer shell encapsulating a gas or a liquid hydrocarbon having a boiling point of less than about 150° C. or less than about 100° C., or less than about 80° C., or a combination thereof. When heated, the gas encapsulated in the shell expands. In the instance where the core comprises a hydrocarbon having a boiling point as described herein, the liquid hydrocarbon turns into a gas, and the internal pressure from the gas increases. Meanwhile upon heating, the polymer shell softens. Accordingly, with the gas trapped inside the spheres, the volume of the microspheres increases creating pores in the foamed product. Expandable microspheres are commercially available as EXPANCEL (AkzoNobel N.V.), ADVANCELL EM (Sekisui Chemical Co., Ltd.), KUREHA microsphere (Kureha Corp.), DUALITE (Chase Corp.), and CLOCELL (PolyChem Alloy).

The polymer melt can comprise about 1 to about 20 parts, about 2 to about 15 parts, or about 5 to about 12 parts by weight of the foaming agent per 100 parts by weight of the high heat polymer. Optionally the polymer melt includes an additive. Additive, as broadly used herein, includes any compound added to the high heat polymer to adjust the properties of the high heat polymer foam, and includes for example a material such as a water-soluble additive useful for preparing a foam, or other additive such as a filler, crosslinking agent, or processing aid.

Fillers, as used herein, include reinforcing and non-reinforcing fillers. Reinforcing fillers include, for example, silica, glass fiber, carbon fiber, or carbon black, which can be added to the high heat polymer to increase strength. Non-reinforcing fillers such as polytetrafluoroethylene (PTFE), molybdenum disulfide ($MoS_2$), or graphite can be added to the high heat polymer to increase the lubrication. Nanofillers are also useful, and are reinforcing or non-reinforcing. Nanofillers, such as carbon nanotubes, nanographene, nanoclay, polyhedral oligomeric silsesquioxane (POSS), or the like, can be incorporated into the high heat polymer to increase the strength and elongation of the material. Nanofillers can further be functionalized to include grafts or functional groups to adjust properties such as solubility, surface charge, hydrophilicity, lipophilicity, and other properties. Combinations comprising at least one of the foregoing fillers can be used.

The crosslinking agent, where included, is for example a sulfur donor, elemental sulfur, silica, a quinone, a peroxy compound, a metal peroxide, a metal oxide, or a combination comprising at least one of the foregoing crosslinking agents. Examples of the sulfur donor include alkyl polysulfides, thiuram disulfides, and amine polysulfides. Some non-limiting examples of suitable sulfur donor agents are 4,4'-dithiomorpholine, dithiodiphosphorodisulfides, diethyldithiophosphate polysulfide, alkyl phenol disulfide, tetramethylthiuram disulfide, 4-morpholinyl-2-benzothiazole disulfide, dipentamethylenethiuram hexasulfide, and caprolactam disulfide. Exemplary quinones include p-benzoquinone, tetramethylbenzoquinone, naphthoquinone, and the like. Peroxy compounds useful as crosslinking agents include alkyl or aryl diperoxy compounds, and metal peroxides. Exemplary aryl diperoxy compounds include those based on dicumyl peroxide (DCP) and marketed by Arkema, Inc. under the tradename DI-CUP® including, DI-CUP® dialkyl peroxide, DI-CUP® 40C dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy) hexane and marketed by Akzo-Nobel under the tradename TRIGONOX® 101. Exemplary metal peroxides include magnesium peroxide, calcium peroxide, zinc peroxide, or the like, or a combination comprising at least one of the foregoing. Metal oxides useful as crosslinking agents include, for example, zinc oxide, magnesium oxide, titanium dioxide, or the like, or a combination comprising at least one of the foregoing.

A processing aid is a compound included to improve flow, moldability, and other properties of the filtration medium formed from the high heat polymer and the foaming agent. Processing aids include, for example an oligomer, a wax, a resin, a fluorocarbon, or the like, or a combination comprising at least one of the foregoing. Exemplary processing aids include stearic acid and derivatives, low molecular weight polyethylene, and the like.

Before extrusion, the high heat polymer, the foaming agent, and the optional additives may be pre-mixed in a mixer, for example a blender as may be purchased from Henschel, in the form of a powder, granules, pellets, liquids, or a combination thereof.

During extrusion, the high heat polymer, the foaming agent, and the optional additives or a pre-mixed combination thereof can be added to an extruder to form a polymer melt, which is then added to the chamber 15. Extruders such as twin-screw extruders are known to a person skilled in the art. The temperature can vary through the different zones of the extruder as needed. During the extrusion, the high heat polymer, the foaming agent, and the optional additives are mixed at a temperature higher than that necessary to cause the mixed composition to flow.

The high heat polymer can be a crystalline polymer or an amorphous polymer. For crystalline polymers, the temperature in the extruder can be equal to or higher than the melting point of the high heat polymer ($T_{MP}$). For example, the temperature in the extruder can vary from $T_{MP}$ to $T_{MP}+30°$ C., from $T_{MP}$ to $T_{MP}+20°$ C., or from $T_{MP}$ to $T_{MP}+10°$ C. As used herein, melting point means peak melting point. For amorphous polymers, the temperature in the extruder can be higher than the glass transition temperature of the high heat polymer ($T_g$). For example, the temperature in the extruder can vary from $T_g+100°$ C. to $T_g+10°$ C. or from $T_g+90°$ C. to $T_g+20°$ C., or from $T_g+100°$ C. to $T_g+30°$ C. Glass transition temperature ($T_g$) and melting point ($T_m$) are determined by differential scanning calorimetry (DSC) as per ASTM D3418-12 with a 20 degrees Celsius per minute (° C./min) heating rate.

The screw speed of the extruder can vary depending on the size of the extruder and the material used, and can be determined by a skilled person without undue experimentation.

Figure 3:
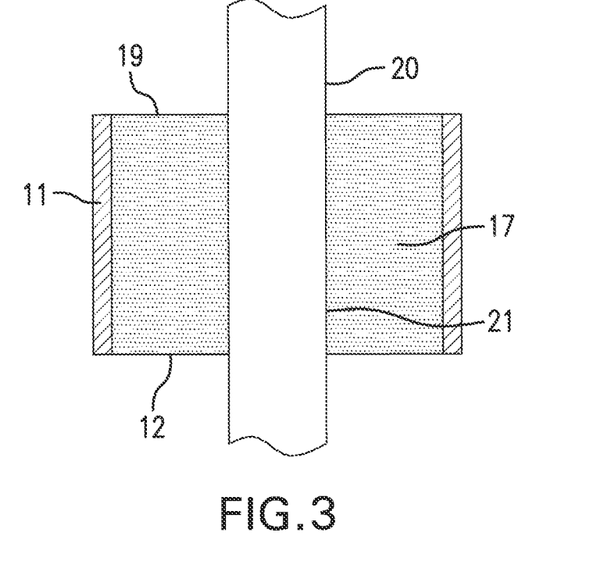
FIG. 3 illustrates the flow control device of FIG. 2A and FIG. 2B where the chamber is sealed.

After the polymer melt is disposed in the chamber 15, the chamber is sealed as shown in FIG. 3. The seal element 19 is a metallic element that is adhered, welded, or otherwise positioned onto the second end 18 of the tubular body 11. The seal element 19 can comprise a metallic matrix material, a disintegrating agent, and an additional material as described herein the context of the tubular member.

Figure 4A:
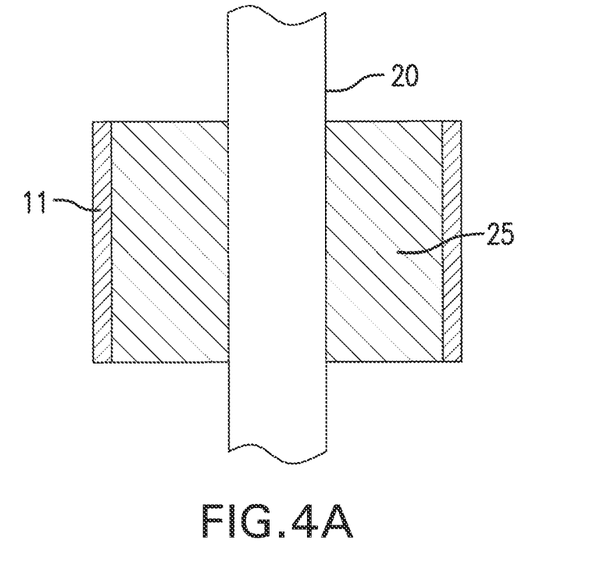
FIG. 4A and FIG. 4B illustrate the flow control device of FIG. 3 where the polymer melt is foamed forming a porous filtration medium in a compacted shape.
Figure 4B:
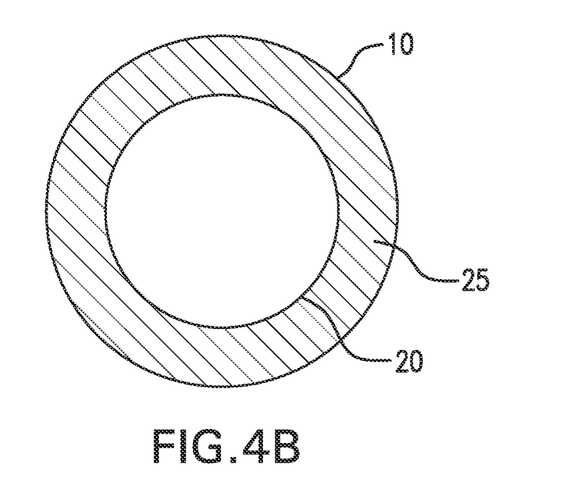

Once the chamber 15 is sealed, the polymer melt 17 is foamed produce a porous filtration medium in a compacted shape as illustrated in FIG. 4A and FIG. 4B. Foaming the polymer melt includes heating the polymer melt in the sealed chamber at a temperature of about 100° C. to about 350° C., or about 120° C. to about 320° C. for about 0.5 hour to 10 hours, about 1 hour to about 8 hours, or about 2 hours to about 6 hours in the presence of the foaming agent and the optional additive. Optionally the tubular body has one or more vents to allow the gas generated during foaming to exit the sealed chamber.

During foaming, a compressive force can be applied to the tubular member. The force is, for example, about 10,000 pounds per square inch (psi) to about 25,000 psi, specifically about 12,000 to about 20,000 psi, and more specifically about 15,000 psi to about 20,000 psi. Under compression and heat, the formed porous filtration medium attains the shape of the tubular member. Without wishing to be bound by theory it is believed that the porous filtration medium in the tubular member can store elastic energy from the expanding of the foaming agent, and after the tubular member is removed, the porous filtration medium can expand and conform to a surface of the borehole Alternatively, a foam can be formed outside of the tubular member from the high heat polymer, the foaming agent, and the optional additive as described herein. The foam has interconnected pores to allow production fluid to flow freely. If commercially produced foams have closed microcell structure, the structure has to be broken to open up the cells. This can be achieved, by increasing pore density (overall pore volume) and conducting repeating cycles of compressing/decompressing the foam. The foam with interconnected pores can then be extruded or pressed into the chamber 15. The tubular member can act like a long narrow die, and the foam inside the chamber has an elongated structure. Removal of the tubular member can cause the foam to expand and regain favorable conformations that minimize entropy.

The porous filtration medium prepared according to the methods disclosed herein have good heat resistance (e.g., at temperatures up to about 275 degrees F., or higher). The filtration medium and flow control devices described herein can thus be used in higher temperature environments than conventional screens and conventional shape memory devices, and may be a viable alternative to gravel packing systems.

Figure 5:
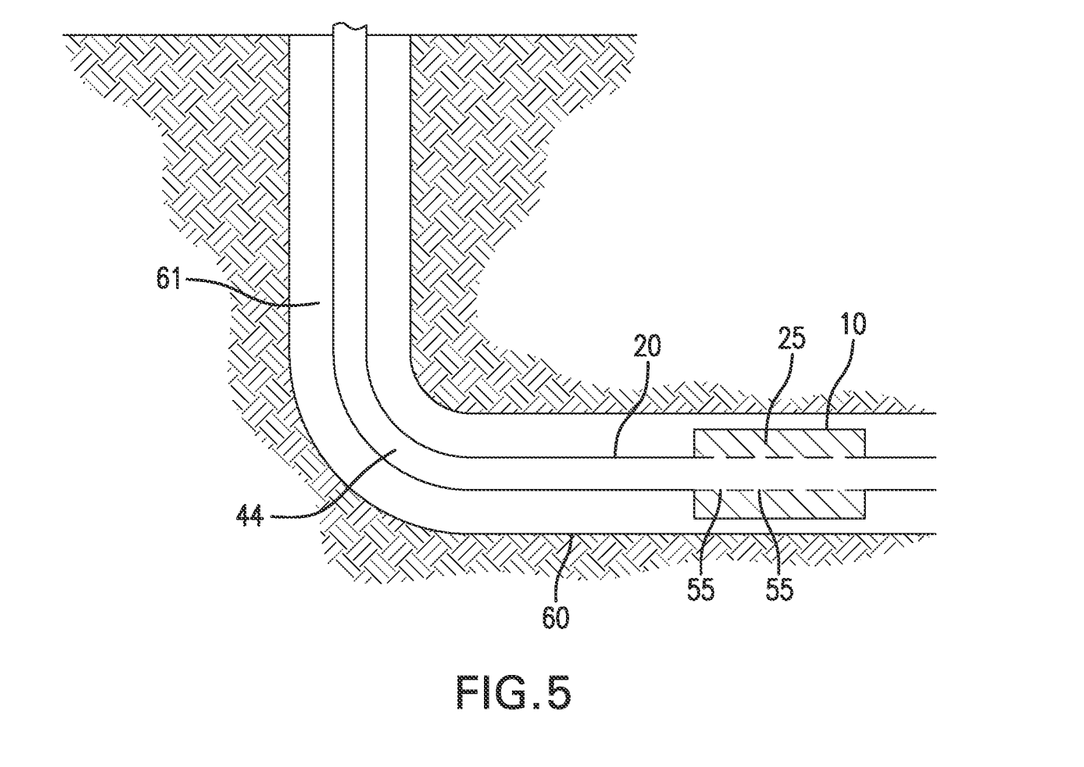
FIG. 5 illustrates deploying the fluid control device of FIG. 4A an FIG. 4B in a borehole.

The fluid control device can then be deployed in a borehole 61 as shown in FIG. 5. Once deployed, the metallic disintegrable tubular member 10 can be removed by exposing the tubular member 10 to a wellbore fluid. Removing the tubular member 10 includes dissolving at least a portion of the tubular member in the wellbore fluid. As used herein, dissolving includes reacting a material of the tubular member with the wellbore fluid via an electrochemical reaction. The wellbore fluid may include any number of ionic fluids or highly polar fluids, such as those that contain various chlorides or bromides. Examples include fluids comprising potassium chloride (KCl), sodium chloride (NaCl), hydrochloric acid (HCl), calcium chloride ($CaCl_2$)), calcium bromide ($CaBr_2$) or zinc bromide ($ZnBr_2$) or a combination comprising at least one of the foregoing.

Figure 6A:
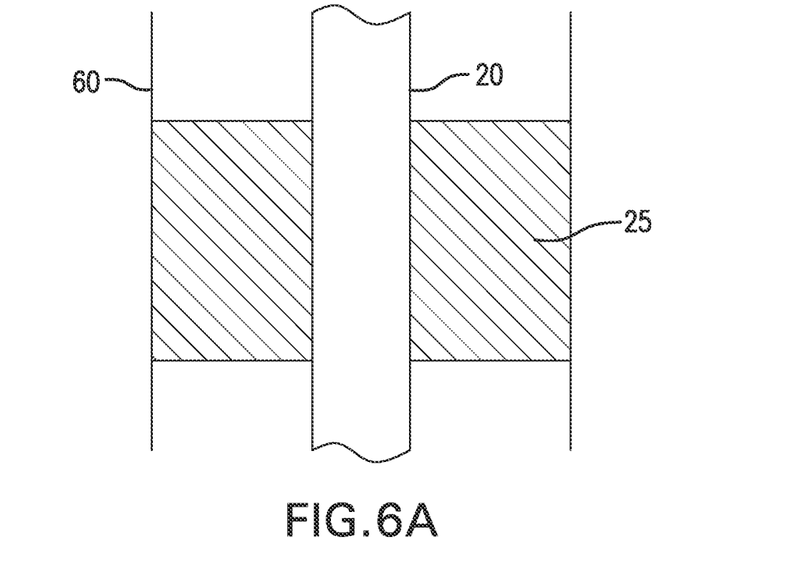
FIG. 6A and FIG. 6B illustrate the fluid control device of FIG. 5 after the tubular member has disintegrated and the porous filtration medium has expanded.
Figure 6B:
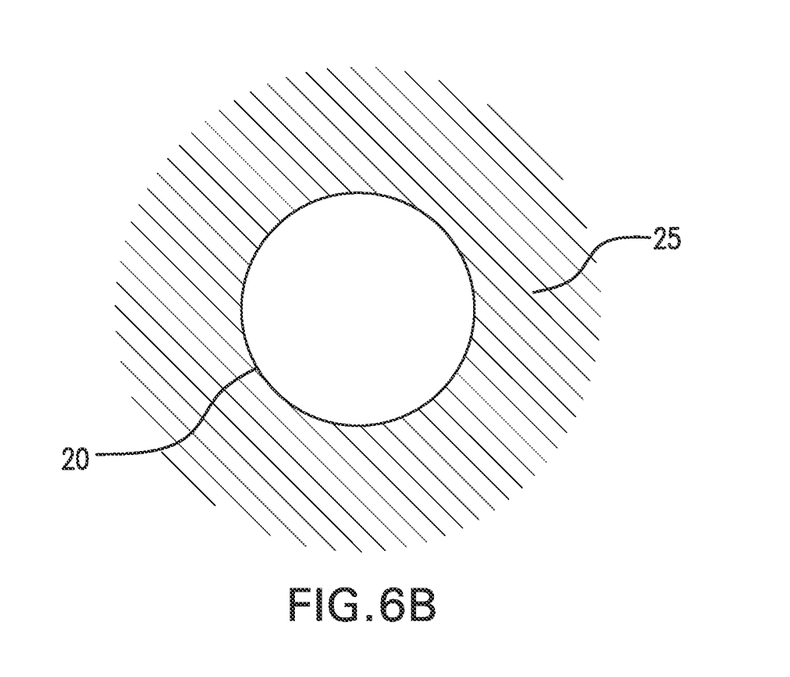

The tubular member 10 allows the filtration medium 25 to be compressed or compacted into a compacted or run-in shape. Once the tubular member 10 is removed, the porous filtration medium 25 can expand to a size or diameter sufficient to contact and conform to a surface 60 of the borehole 61 as shown in FIG. 6A and FIG. 6B.

Optionally an activation fluid is also used to facilitate the expansion of the porous filtration medium 25. The activation fluid acts to reduce the glass transition temperature of the medium to a temperature that is at or below the temperature of a downhole environment. For example, the activation fluid is configured to reduce the glass transition temperature to below about 220-250 degrees F., or other temperature level or range encountered downhole. The activation fluid is selected based on considerations including downhole temperature and desired transition temperature.

The activation fluid may be a water based fluid, such as a brine or water based drilling mud, or an oil based fluid. The activation fluid includes an activation agent. Examples of activation agents include, but are not limited to, dimethyl sulfoxide, ketones, alcohols, glycols, ethers, and a combination comprising at least one of the foregoing. Examples of alcohols include methanol, ethanol, and isopropyl alcohol. Glycols can include ethylene glycol and propylene glycol. Ethers can include ethylene glycol monobutyl ether (EGMBE). Specific ketones include acetone and acetylacetone.

As a result of the porous filtration medium being expanded to its set position, the porous medium can prevent production of undesirable solids from the formation and allow only desired hydrocarbon fluids to flow through the filtration medium.

A plurality of holes or other fluid passages 55 on the support structure 20, for example a base pipe, provide fluid paths for fluid entering through the porous medium 25 to flow through the support structure 20 and into an inner fluid conduit 44 defined by the support structure. The inner fluid conduit in turn can be connected to a borehole string or otherwise in fluid communication with a selected location such as a surface location, thus allowing the production of hydrocarbon to the surface location.

Set forth below are some embodiments of the foregoing disclosure:

Embodiment 1. A method of manufacturing a fluid control device, the method comprising: extruding a polymer melt into a chamber defined by an outer surface of a support structure and a disintegrable metallic tubular member disposed at the support structure, the polymer melt comprising a high heat polymer and a foaming agent, the high heat polymer having a heat deflection temperature of about 100° C. to about 300° C. measured at 1.82 MPa in accordance with ASTM D648-18; sealing the chamber; and foaming the high heat polymer to produce a porous filtration medium in a compacted shape.

Embodiment 2. The method as in any prior embodiment, wherein the high heat polymer has a heat deflection temperature of about 150° C. to about 280° C. measured at 1.82 MPa in accordance with ASTM D6480-18.

Embodiment 3. The method as in any prior embodiment, wherein the high heat polymer comprises one or more of the following: polysulfone (PSU), polyphenylsulfone (PPSU), polyether ether ketone (PEEK), polyphenylene sulfide (PPS), polyetherimide (PEI), polyamide-imide (PAI), polyimide (PI), polybenzimidazole (PBI), polytetrafluoroethylene (PTFE), polyethylene terephthalate (PET), polycarbonate (PC), polyether sulfone (PES), or polyether ketone (PEK).

Embodiment 4. The method as in any prior embodiment, wherein the foaming agent comprises one or more of the following: azodicarbonamide, sodium bicarbonate, a combination of sodium carbonate and citric acid, sodium polyacrylate, polypropylene carbonate, isocyanate, polysiloxane, or a polymeric microsphere.

Embodiment 5. The method as in any prior embodiment, wherein the polymer melt comprises about 1 to about 20 parts by weight of the foaming agent per 100 parts by weight of the high heat polymer.

Embodiment 6. The method as in any prior embodiment, wherein the polymer melt further comprises one or more of a crosslinking agent, a filler, or a processing aid.

Embodiment 7. The method as in any prior embodiment, wherein the disintegrable metallic tubular member has a tubular body with a first end and an opposite second end, and a seal element positioned onto the tubular body at the first end of the tubular member Embodiment 8. The method as in any prior embodiment, wherein the tubular body comprises one or more of Zn, Mg, Al, Mn, or alloy thereof.

Embodiment 9. The method as in any prior embodiment, wherein sealing the chamber comprises welding or adhering a second seal element onto the tubular body.

Embodiment 10. The method as in any prior embodiment, wherein the tubular body has one or more vents to allow a gas generated during foaming to exit the sealed chamber.

Embodiment 11. The method as in any prior embodiment, wherein foaming the high heat polymer comprises heating the polymer melt at a temperature of about 100° C. to about 350° C. for about 30 minutes to about 10 hours.

Embodiment 12. The method as in any prior embodiment, wherein the support structure comprises a tubular having a fluid conduit defined therein, and the porous filtration medium is disposed at the support structure.

Embodiment 13. A method of manufacturing a fluid control device, the method comprising: extruding a foam into a chamber defined by an outer surface of a support structure and a disintegrable metallic tubular member disposed at the support structure, the foam comprising a high heat polymer having a heat deflection temperature of about 100° C. to about 300° C. measured at 1.82 MPa determined according to ASTM D648.

Embodiment 14. The method as in any prior embodiment, wherein the high heat polymer comprises one or more of the following: polysulfone (PSU), polyphenylsulfone (PPSU), polyether ether ketone (PEEK), polyphenylene sulfide (PPS), polyetherimide (PEI), polyamide-imide (PAI), polyimide (PI), polybenzimidazole (PBI), polytetrafluoroethylene (PTFE), polyethylene terephthalate (PET), polycarbonate (PC), polyether sulfone (PES), or polyether ketone (PEK).

Embodiment 15. A fluid control method comprising: manufacturing a fluid control device according to a method as in any prior embodiment; deploying the fluid control device in a borehole; removing the disintegrable metallic tubular member to cause the porous filtration medium to expand, and conform to a surface of the borehole; and flowing a fluid through the porous filtration medium.

Embodiment 16. The fluid control method as in any prior embodiment, wherein removing the disintegrable metallic tubular member comprises dissolving at least a portion of the disintegrable metallic tubular member in a wellbore fluid.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of manufacturing a fluid control device, the method comprising:
   extruding a polymer melt into a chamber defined by an outer surface of a support structure and a disintegrable metallic tubular member disposed at the support structure, the polymer melt comprising a high heat polymer and a foaming agent, the high heat polymer having a heat deflection temperature of about 100° C. to about 300° C. measured at 1.82 MPa in accordance with ASTM D648-18;
   sealing the chamber; and
   foaming the high heat polymer to produce a porous filtration medium in a compacted shape.

2. The method of claim 1, wherein the high heat polymer has a heat deflection temperature of about 150° C. to about 280° C. measured at 1.82 MPa in accordance with ASTM D648-18.

3. The method of claim 1, wherein the high heat polymer comprises one or more of the following: polysulfone (PSU), polyphenylsulfone (PPSU), polyether ether ketone (PEEK), polyphenylene sulfide (PPS), polyetherimide (PEI), polyamide-imide (PAI), polyimide (PI), polybenzimidazole (PBI), polytetrafluoroethylene (PTFE), polyethylene terephthalate (PET), polycarbonate (PC), polyether sulfone (PES), or polyether ketone (PEK).

4. The method of claim 1, wherein the foaming agent comprises one or more of the following: azodicarbonamide, sodium bicarbonate, a combination of sodium carbonate and citric acid, sodium polyacrylate, polypropylene carbonate, isocyanate, polysiloxane, or a polymeric microsphere.

5. The method of claim 1, wherein the polymer melt comprises about 1 to about 20 parts by weight of the foaming agent per 100 parts by weight of the high heat polymer.

6. The method of claim 1, wherein the polymer melt further comprises one or more of a crosslinking agent, a filler, or a processing aid.

7. The method of claim 1, wherein the disintegrable metallic tubular member has a tubular body with a first end and an opposite second end, and a seal element positioned onto the tubular body at the first end of the tubular member.

8. The method of claim 7, wherein the tubular body has one or more vents to allow a gas generated during foaming to exit the sealed chamber.

9. The method of claim 7, wherein the tubular body comprises one or more of Zn, Mg, Al, Mn, or alloy thereof.

10. The method of claim 1, wherein sealing the chamber comprises welding or adhering a second seal element onto the tubular body.

11. The method of claim 1, wherein foaming the high heat polymer comprises heating the polymer melt at a temperature of about 100° C. to about 350° C. for about 0.5 hour to about 10 hours.

12. The method of claim 1, wherein the support structure comprises a tubular having a fluid conduit defined therein, and the porous filtration medium is disposed at the support structure.

13. A fluid control method comprising:
manufacturing a fluid control device according to a method of claim 12;
deploying the fluid control device in a borehole;
removing the disintegrable tubular member to cause the porous filtration medium to expand, and conform to a surface of the borehole; and
flowing a fluid through the porous filtration medium.

14. A fluid control method comprising:
manufacturing a fluid control device according to a method of claim 1;
deploying the fluid control device in a borehole;
removing the disintegrable metallic tubular member to cause the porous filtration medium to expand, and conform to a surface of the borehole; and
flowing a fluid through the porous filtration medium.

15. The fluid control method of claim 14, wherein removing the disintegrable metallic tubular member comprises dissolving at least a portion of the disintegrable metallic tubular member in a wellbore fluid.

16. A method of manufacturing a fluid control device, the method comprising:
extruding a foam into a chamber defined by an outer surface of a support structure and a disintegrable metallic tubular member disposed at the support structure, the foam comprising a high heat polymer having a heat deflection temperature of about 100° C. to about 300° C. measured at 1.82 MPa determined according to ASTM D648-18.

17. The method of claim 16, wherein the high heat polymer comprises one or more of the following: polysulfone (PSU), polyphenylsulfone (PPSU), polyether ether ketone (PEEK), polyphenylene sulfide (PPS), polyetherimide (PEI), polyamide-imide (PAI), polyimide (PI), polybenzimidazole (PBI), polytetrafluoroethylene (PTFE), polyethylene terephthalate (PET), polycarbonate (PC), polyether sulfone (PES), or polyether ketone (PEK).

* * * * *